United States Patent
Hu et al.

(10) Patent No.: US 6,668,097 B1
(45) Date of Patent: Dec. 23, 2003

(54) METHOD AND APPARATUS FOR THE REDUCTION OF ARTIFACT IN DECOMPRESSED IMAGES USING MORPHOLOGICAL POST-FILTERING

(75) Inventors: Yu Hen Hu, Middleton, WI (US); Truong Q. Nguyen, Burlington, MA (US); Seyfullah H. Oguz, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/554,034

(22) PCT Filed: Aug. 9, 1999

(86) PCT No.: PCT/US99/20965
§ 371 (c)(1),
(2), (4) Date: May 8, 2000

(87) PCT Pub. No.: WO00/14968
PCT Pub. Date: Mar. 16, 2000

Related U.S. Application Data
(60) Provisional application No. 60/099,794, filed on Sep. 10, 1998.

(51) Int. Cl.[7] .............................. G06K 9/40; G06K 9/20
(52) U.S. Cl. ..................... 382/275; 382/283; 382/264; 382/266; 382/254; 382/233
(58) Field of Search .............................. 382/233, 235, 382/254, 256, 257, 258, 260, 261, 264, 266, 268, 274, 275, 283, 305, 308; 358/3.26, 462, 530; 348/607, 610; 375/240.11

(56) References Cited

U.S. PATENT DOCUMENTS 4,939,576 A * 7/1990 Campbell .................. 348/607
5,327,262 A     7/1994 Williams ................... 358/462
5,644,513 A * 7/1997 Rudin et al. ............... 702/190
5,822,458 A * 10/1998 Silverstein et al. ......... 382/235
6,141,446 A * 10/2000 Boliek et al. .............. 382/233

FOREIGN PATENT DOCUMENTS

WO     WO 96/42165      12/1996

OTHER PUBLICATIONS

PCT International Search Report dated Dec. 28, 1999 in PCT Appln. No. PCT/US99/20965.

Hiroyuki Okada et al., "An Adaptive Image Quality Improvement Method for DCT Coding Shemes," Proceedings of the 1993 Picture Coding Symposium, Lausanne, Switzerland, XP000346472.

Yiu–fai Wong, "Image Enhacement by Edge–Preserving Filtering," IEEE 1994, pp. 522–524, XP000522685 (abstract).

Sang Hee Kim et al., "An Edge–Based Adaptive Morphology Algorithm for Image Noise Reduction," IEEE, Mar. 1997, XP002124205 (abstract).

* cited by examiner

Primary Examiner—Andrew W. Johns
Assistant Examiner—Amir Alavi
(74) Attorney, Agent, or Firm—Quarles & Brady LLP

(57) ABSTRACT

An apparatus for post-processing of decompressed images having ringing artifacts identifies edges of the image such as may generate such artifacts and defines zones outside of those edges but conforming thereto in which ringing artifacts are to be expected. These zones may be modified according to a model of the human visual system and then filtered so as to reduce ringing artifacts. The filtered zones are spliced back into the image minimizing unnecessary modification of the image while reducing ringing artifacts.

16 Claims, 3 Drawing Sheets

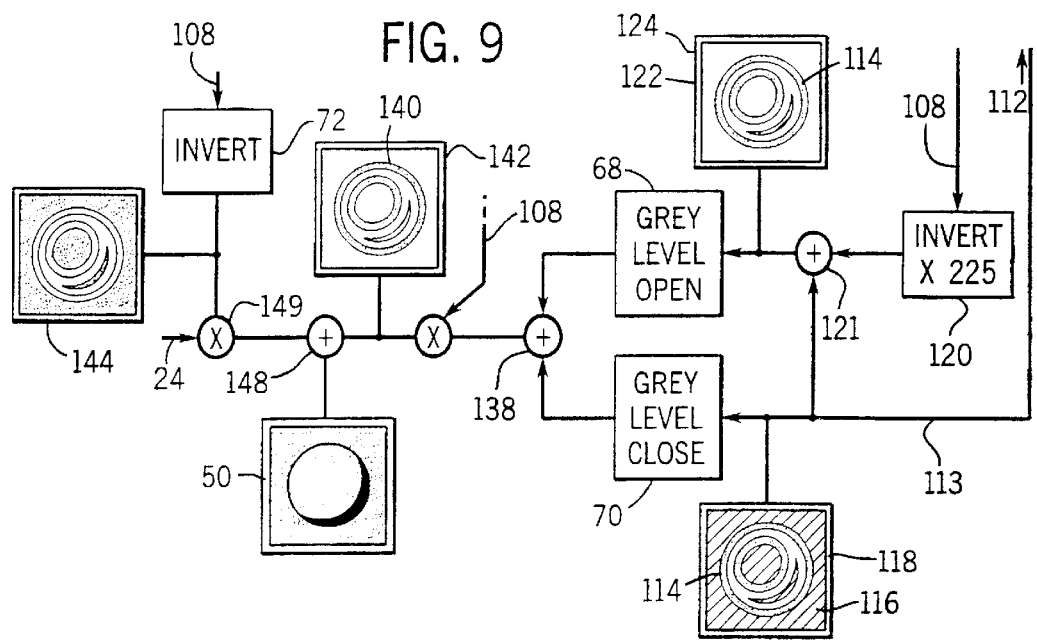
FIG. 9
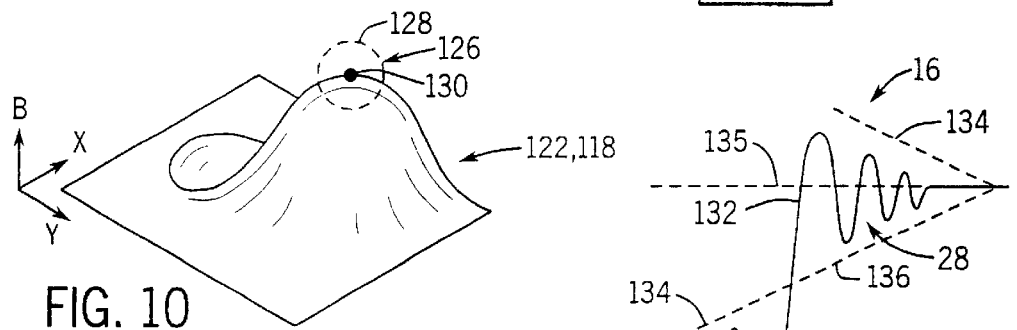
FIG. 10
FIG. 11
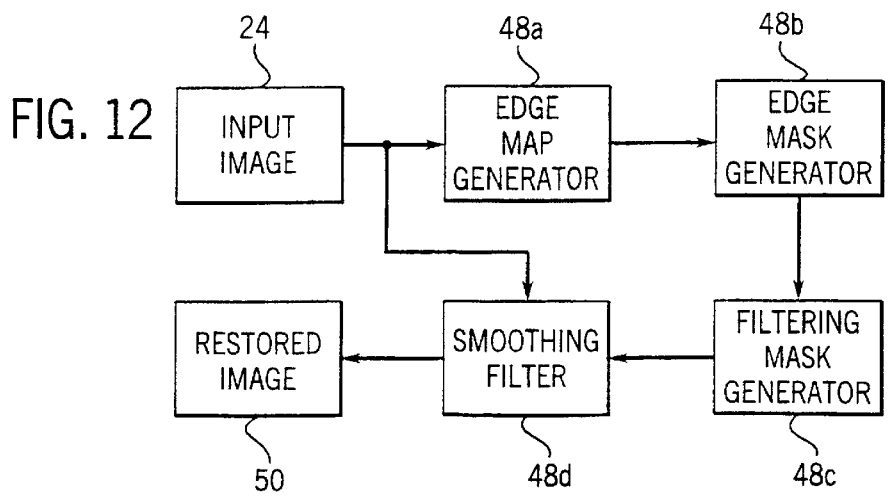
FIG. 12

METHOD AND APPARATUS FOR THE REDUCTION OF ARTIFACT IN DECOMPRESSED IMAGES USING MORPHOLOGICAL POST-FILTERING

CROSS-REFERENCE TO RELATED APPLICATIONS

This application is based on provisional application 60/099,794 filed Sep. 10, 1998 and entitled "Imaging Ringing Artifact Reduction Using Morphological Post-Filtering" and claims the benefit thereof.

STATEMENT REGARDING FEDERALLY SPONSORED RESEARCH OR DEVELOPMENT

This invention was made with United States government support awarded by the following agencies: NSF Grant No. 9501589. The United States has certain rights in this invention.

BACKGROUND OF THE INVENTION

This invention relates generally to the decompression of electronically transmitted and stored images and specifically to a method of eliminating ringing artifacts occurring with some image compression methods under medium and high compression ratios.

A color image acquired by current digital cameras may have the equivalent of 100 pages of text information. Higher quality images from next generation "megapixel" cameras exceed the capacity of common floppy disk storage and strain voice grade telephone communication channels.

A variety of data compression techniques are known to reduce the amount of image data that must be stored or transmitted. Highest compression ratios are obtained by "lossy" compression schemes where compressed data is irreversibly degraded, for example, by using larger pixels or fewer gray levels or colors, or by more sophisticated techniques which truncate spatial frequency information. Sophisticated lossy compression schemes such as JPEG and MPEG attempt to discard information that is not critical to the perception of a typical human viewer. These systems take advantage of known information about the human visual system ("HVS").

Lossy compression schemes may be combined with "lossless" compression schemes where the data is compressed without loss of information, for example, through "zero length encoding" in which a string consisting of a number of consecutive zeros in the image, or more generally any pattern of consecutive pixels, is replaced with a shorter code designating that number or pattern.

After the image is compressed it may be decompressed by a program which generally restores the compressed and encoded data into a human readable format. With high compression ratios, and lossy compression systems, image artifacts may appear in the decompressed image. One such, artifact is ringing, in which spurious ripples flank the edges of abrupt contrast changes. Ringing artifacts result from a loss of high spatial frequency information necessary to accurately represent the edge. The human visual system is known to be sensitive to ringing artifacts which practically place an upper limit on the amount of useful compression of electronic images.

BRIEF SUMMARY OF THE INVENTION

The present invention provides a method and apparatus for post decompression reduction of ringing artifacts. Generally, the invention identifies edges in the decompressed image and then, based on those edges, defines zones about the edges where ringing artifact may be prominent. These zones may be modified based on an a priori modeling of the human visual system and then the image within these zones is filtered to reduce the ringing artifacts. The definition of the zones is such as to exclude the edges themselves and to minimize filtering in areas where the ringing would not be perceived.

Specifically, the present invention provides an image processing system receiving a decompressed image and having an edge detector identifying edges between contrasting regions of pixels of the image. A mask generator working with the identified edges defines a region in the image adjacent to and conforming to the identified edges. A low pass spatial filter operating only within the defined regions filters the decompressed image to selectively reduce ringing artifacts near those edges.

It is therefore one object of the invention to permit increased compression of images by reducing ringing artifacts. The selective identification of zones for filtering decreases the level of the ringing artifacts while preserving edge structure and other features of the image.

It is another object of the invention to provide artifact reduction for a variety of image compression techniques without the need to modify the compression or decompression techniques or to necessarily have knowledge of the particular compression technique being used. The invention, in its essential form, works directly and only on the decompressed image. As a result, application of the invention is not limited to current image compression techniques but may be applicable to future image compression and decompression methods in which ringing artifacts is a problem.

The image processing system of the present invention may include a model of the human visual system manifest as one or more properties from which rules are derived which are used to modify application of the low pass filter according to a perceptional model of the sensitivity of standard human vision. For example, the human visual system model may reduce the need for low pass filtering of regions that have low brightness values or high variance in brightness values as is determined from the decompressed image. The modification may be done by modifying the regions to which the filter is applied.

Thus it is another object of the invention to minimize filtering, and thus the risk of unnecessary image degradation, in portions of the image where ringing artifacts would not be objectionable to a human viewer.

The detection of the image edges and the defining of the mask regions as well as the low pass spatial filtering may be performed by binary and gray scale morphological operators.

Thus it is another object of the invention to provide a method of reducing ringing artifact that requires only simple binary or integer arithmetic and thus which may be performed at high speed in specialized electronic circuits or on a computer processor.

The foregoing and other objects and advantages of the invention will appear from the following description. In the description, reference is made to the accompanying drawings which form a part hereof and in which there is shown by way of illustration a preferred embodiment of the invention. Such embodiment does not necessarily represent the full scope of the invention, however, and reference must be made to the claims herein for interpreting the scope of the invention.

BRIEF DESCRIPTION OF THE SEVERAL VIEWS OF THE DRAWINGS

FIG. 9 is a detailed view of the next four blocks of FIG. 2, showing gray level opening and closing together with simplified representations of the image during these steps;

FIG. 10 is a perspective rendition of the three dimensional gray level opening and closing process; and FIG. 11 is a graphical representation of the averaging effect of combining gray level opening and gray level closing of the image data.

FIG. 12 is a block diagram providing an overview of the present invention indicative of the final image.

DETAILED DESCRIPTION OF THE INVENTION

Figure 1:
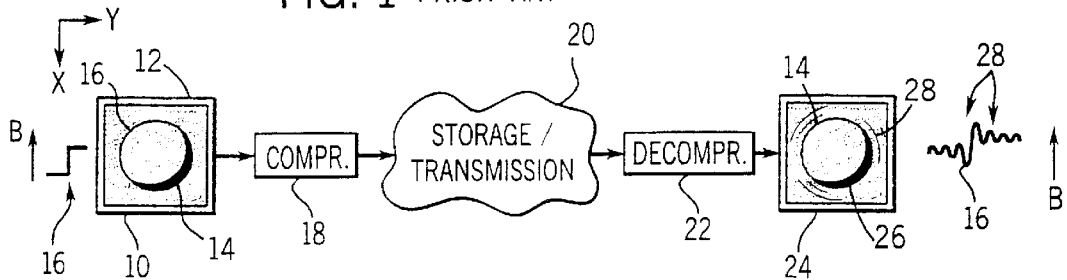
FIG. 1 is a schematic diagram of a prior art compression and decompression operation in which an image is compressed, stored or transmitted then decompressed to produce a decompressed image having ringing artifacts.

Referring now to FIG. 1, a sampled and digitized image 10 may be generally acquired and represented as a two-dimensional array of pixels 12 (along axes x and y) having brightness values B henceforth taken to represent either different levels of gray or different colors as is well understood in the art where B will represent either the luminance, chrominance or color components.

A depicted object 14 may have edges defined by sharp changes in values B as a function of spatial position in the image 10. One edge 16 is depicted along a line graph to the left of the image 10 by plotting B for pixel positions along the y-axis taken through the depicted object 14. Generally in an uncompressed image 10, the edges 16 will be sharp and clearly defined.

The uncompressed image 10 may be operated on by a compression system 18 which may include such compression systems such as JPEG, MPEG or more advanced wavelet-type transformations including the GenLOT transformation described in *The GenLOT: Generalized Linear-Phase Lapped Orthogonal Transform*, IEEE Transactions on Signal Processing, vol. 44, pp. 497–507, March 1996, co-authored by one of the inventors of the present invention.

The compressed image data may then be stored or transmitted as indicated by process block 20 and at a later time decompressed using a complementary decompression technique, as indicated by process block 22. The result is a decompressed image 24 showing a decompressed object 26 combining object 14 and ringing artifacts 28. The ringing artifacts 28 are oscillations adjacent to image edges 16 depicted by a line graph to the right of the image 24 similar to that next to image 10.

Figure 3:
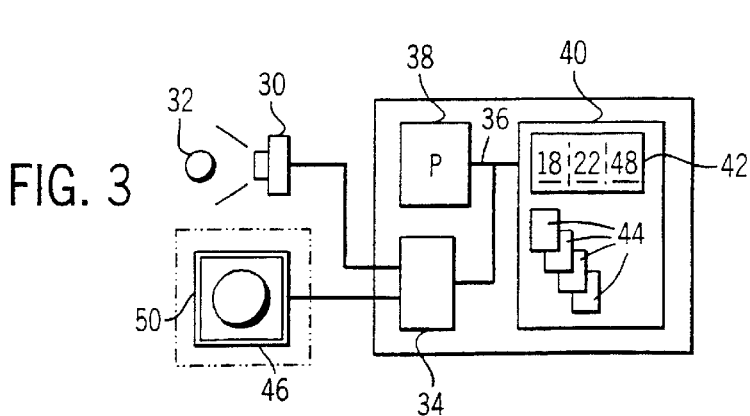
FIG. 3 is a schematic block diagram of an electronic processor such as may be part of a digital camera or a desktop computer and which is suitable for use in practicing the present invention.

Referring now to, FIG. 3, the uncompressed image 10 may be obtained by a CCD-type camera 30, for example, imaging an actual object 32. The CCD camera 30 may be connected to an interface circuit 34 to provide sampled and digitized image pixels to a processor 38 and a memory 40.

The processor 38 executes a stored program 42 to receive the data from the CCD 30 which may be compressed by a compression portion 18 of the program 42 and stored as one of a number of compressed images 44 in memory 40. At a subsequent time the processor 38 may recall a compressed image 44 for decompression by portion 22 of the program 42. The decompressed image will typically have ringing artifacts and may then be provided to a ringing artifact reduction portion 48 of the program 42 to produce a reduced artifact image 50 which may be sent to an output device 46 such as a printer or the like for display.

Referring now to FIG. 12, an overview of the present invention provides four artifact reduction steps 48a–48d. The first step 48a receives the decompressed image 24 to detect the edges in the image about which artifacts will occur. At the second step 48b, the detected edges are used to produce a mask covering those edges. At third step 48c, the edge mask is used to generate a filter mask open at the regions around the edges where artifacts are likely to be encountered. Finally at fourth step 48d, a filter is applied to the regions exposed by the filter mask to reduce the artifacts in the exposed region of the filter mask to produce finished image 50. What follows now will be a description of one embodiment of the invention implementing these steps 48a–48d.

Figure 2:
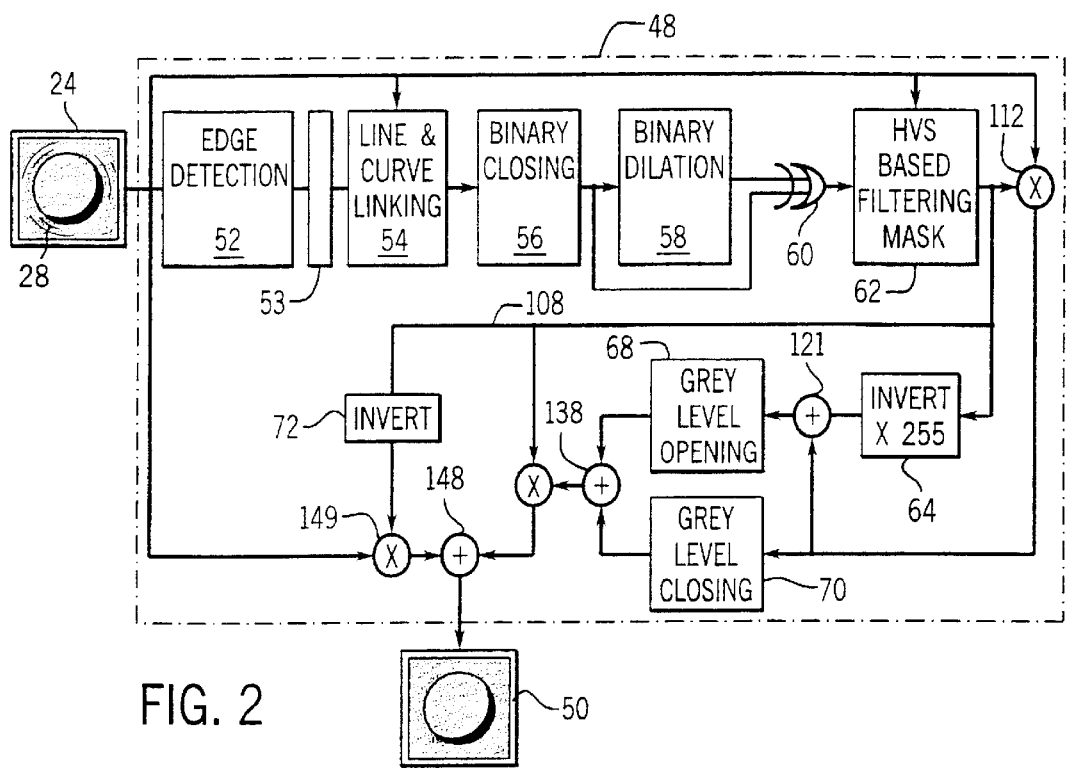
FIG. 2 is a block diagram providing an overview of the present invention receiving the decompressed image of FIG. 1 to produce an image with reduced ringing artifacts.

Referring now to FIG. 2, the ringing artifact reduction program 48 receives the decompressed image 24 at an edge detection block 52. Edges detected by the edge detection block 52 are provided to a noise cleaning block 53 which eliminates erroneous "edge-like" features through one or more conventional noise filtering techniques known in the art. Next a line and curve linkage block 54 which connects the cleaned edges into substantially continuous lines and curves. Binary closing and binary dilation blocks 56 and 58, respectively, are used to define a zone around the identified edges where ringing artifact may occur. These zones are overlaid on the detected edges by an exclusive OR block 60 so as to create a mask eliminating the edges themselves to preserve the edges from degradation. The mask may be modified by a human visual system model 62, then applied to the original decompressed image. Where the decompressed image shows through is filtered by a morphological filter formed generally by blocks 64, 68, 70, 121 and 138. These filtered regions are then combined with the unfiltered regions of the decompressed image 24, identified by an inverted mask 72, and the combination output to provide for the reduced artifact image 50.

Each of these steps will now be described in greater detail together with a representation of a simple image as it is processed. In the represented images, stippling will represent gray scale image data, cross hatching will represent the binary zero value and white will represent the binary maximum value, e.g., 255. On occasion thin white lines will be represented as black lines as will be noted. It will be understood that the example does not limit the invention to gray scale images or to images of particular size, resolutions or depth. In the description of these blocks, various predetermined parameters will be described such as those controlling the amount of dilation or opening or closing filtering. It will be understood that these parameters may be determined and adjusted empirically depending on subjected objectives of image type and quality.

Figure 4:
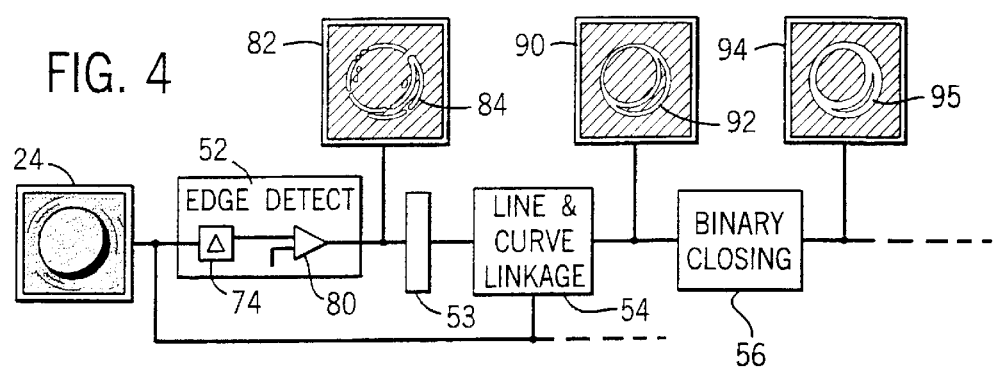
FIG. 4 is a detailed view of the first four blocks of FIG. 2 showing edge detection, filtering against noise, line and curve linkage and binary closing together with simplified representations of the image during these steps.
Figure 5:
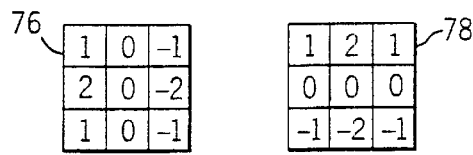
FIG. 5 is an integer template applied to the decompressed image to detect, edges thereof per the edge detection block of FIG. 4.

Referring now to FIG. 4, as mentioned above, the decompressed image 24 is first received by the edge detection block 52 which performs a two-dimensional differentiation on the data B of the image with respect to x and y. Referring to FIG. 5, this differentiation may be readily accomplished by applying two templates 76 and 78 (forming a Sobel operator) to each pixel of the image 24. The templates are each 3×3 matrices of integers. The templates are aligned with their centers on each pixel of the image 24, and a multiplication is performed between the value of each pixel overlaid by the template and the value of the template at that point. These products are summed and the sum for each templates 76 and 78 are squared and then summed together to produce a value indicating the rate of change of B in the image 24 in the neighborhood of the pixel with which templates 76 and 78 are aligned.

Because the templates 76 and 78 contains only integers with magnitudes of zero, one and two, the necessary multiplications are trivial and can be performed very rapidly by an electronic processor or by dedicated circuitry well understood in the art.

The differentiation value produced for each pixel is compared to a predetermined threshold as indicated by comparator 80 to identify the particular pixel as an edge or not an edge. The threshold provided to the comparator 80 may be set based on a histogram analysis of the differentiation (gradient) values in the image.

Referring to image 82 of FIG. 4, generally the result of this operation will be a field of black pixels (depicted as cross hatching in FIG. 4) with selected white pixels 84 representing edges (depicted as black lines in FIG. 4). Image 82 may be stored as a binary matrix and thus requires relatively little memory.

Following the edge detection block 52, and as indicated by block 53, some filtering may be performed to eliminate very short erroneous edge-like features and single isolated pixels. A single or successive morphological pruning operation, as is well understood in the art, may be employed or other similar techniques.

Figure 6:
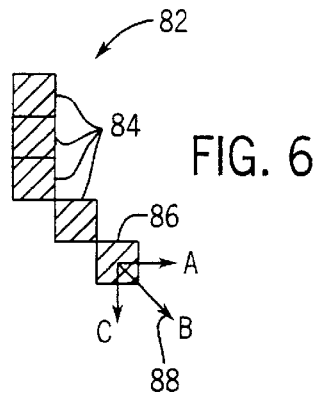
FIG. 6 is a diagram of pixels of a detected edge used to illustrate operation of the curved linkage block of FIG. 4.

The edges extracted by the edge detection block 52, as represented by image 82 and the original decompressed image 24, are provided to the line and curve linkage block 54. Referring also to FIG. 6, white pixels 84 (here identified by cross-hatching) within image 82 are analyzed to identify certain pixels 84 as end pixel 86 if and only if the pixel 84 has only a single neighbor pixel 84. The Sobel templates 76 and 78 are then applied to the end pixels 86 to determine a gradient direction 88 by comparing the sum from each template alone. The gradient direction 88 is represented by a single directional arrow FIG. 6, but in actuality is a bi-directional axis of direction which allows possible backtracking along pixels 84.

Based on the direction 88, three pixels depicted as A, B and C adjacent to the end pixel 86 are selected from the original decompressed image 24. If the gradient value of at least one of the pixels A, B and C is above a predetermined threshold, the pixel A, B or C with the greatest gradient value is adopted as a next end pixel 86 and the process is repeated. The threshold employed by the line and curve linkage block 54 may be a fixed percentage of the threshold used for edge-detection, for example, one-tenth of that value. When no pixel A, B, or C gradient is above the threshold, or a border of the image, or an already existing edge pixel is encountered, the process ends.

Referring now to image 90, by this process, the lines of white pixel 84 are made substantially continuous as indicated by edges 92 (depicted as dark lines in FIG. 4). The image 90 is then provided to a binary closing block 56 which performs successive morphological dilations and erosions so as to further fill in gaps between pixels of edges 92 and to fill in spaces between adjacent edges 92 such as may represent opposing edges of a single depicted structure. Because the ringing artifacts 28 are the result of losing high frequency image data, the amount of closing is set so as to fill in structures which are thin enough to accommodate one full cycle of the ringing induced oscillation. The resulting image 94 thus contains significant and expanded white areas.

Figure 7:
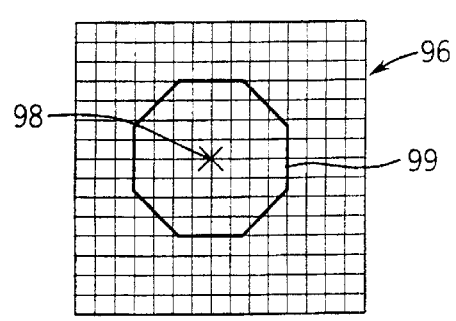
FIG. 7 is a simplified representation of a template which may be applied to image data to effect the binary closing of FIG. 4.

Referring now to FIG. 7, the erosion and dilation operations use a morphological structuring element 96 being a matrix of values which, like templates 76 and 78, may be overlaid on the pixels of the image with a center point 98 positioned successively on each pixel. A perimeter 99 of approximately fixed radius surrounds the center point 98. For the dilation operation, if the pixel aligned with center point 98 is white then all the pixels within the perimeter 99 are made white otherwise no change occurs. With the erosion operation, if all the pixels within the perimeter 99 are white, then the pixel aligned with the centerpoint 98 is made white, otherwise the pixel aligned with the center point 98 is set to black.

Figure 8:
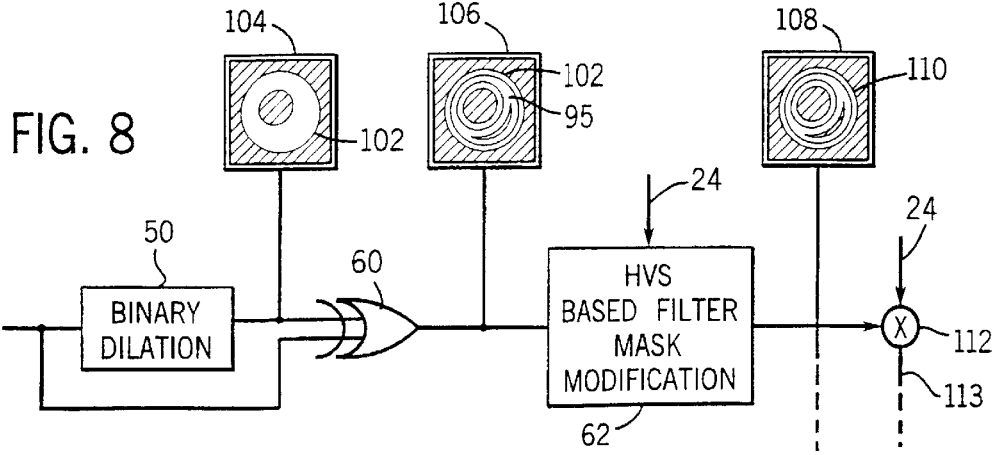
FIG. 8 is a detailed view of the next two blocks of FIG. 2 showing binary dilation and HVS-based-filtering mask modification together with simplified representations of the image during these steps.

After the binary closing block 56 of FIG. 4, the image 94 is received by binary dilation block 58 shown in FIG. 8. The dilation operation applies the structuring element 96 as has been described. As a result of this dilation the lines 95 of image 94 are expanded to form filtering zones 102 within an image 104.

The exclusive OR block 60 merges image 104 and the image 94 so as to exclude lines 95 of image 94 from the filtering zone 102 of image 104. The resultant image 106 defines by its white region a mask which identifies regions where ringing artifacts are likely to occur, however, line 95 from image 94 masks the actual edges causing those ringing artifacts so in the subsequent application of filtering to the regions the edges are preserved with their sharpness.

The mask of image 106 is next provided to the HVS-based filtering mask modification block 62 which modifies the filtering zone 102 according to known characteristics of the human visual system. In the preferred embodiment, the filtering zone 102 is modified by two HVS characteristics. The first is that the human visual system is less sensitive to ringing artifacts in dark portions of the image, and the second is that the human visual system is less sensitive to ringing artifacts when they are superimposed on backgrounds that are not smooth, or in other words, which have high variation in brightness.

Accordingly at the HVS-based filtering mask modification block 62, each portion of the original image 24 within the filtering zone 102 of image 106 is reviewed and its average local brightness and local variance values are calculated on a fixed partition of the image. The mean local brightness and the local variance values are used to decide on keeping or removing the relevant neighborhood (partition segment) from the filtering zone 102 to yield an image 108 which has, in general, expanded black areas and thus a white region 110 which is a subset of the white region 102 defined in image 106 (i.e., smaller in area).

Referring again to FIGS. 2 and 9, the modified mask of image 108 is then provided to a multiplication block 112 and multiplied with the original image 24 so as to create an image 118 (communicated on path 113) in which corresponding gray scale portions 114 replace the white regions 110 of image 108 and black regions 116 replace the similarly black background of image 108 as shown FIG. 9. Thus masked image 118 provides the portions of the original image 24 which will be filtered to eliminate ringing artifacts.

The mask of image 108 of FIG. 8 is also inverted and multiplied by 255 at block 120 so as to make its white areas black and its black areas white and is then added to masked image 118 by summing block 121 to produce complimentary masked image 122 identical to masked image 118, except that the wholly black regions 116 in masked image 118 have now become value 255 or white as indicated by regions 124. As will be described these symmetrically masked images 122 and 118 are simultaneously filtered to reduce ringing artifacts and then combined.

Referring now to FIG. 9, the actual filtering is performed using gray level opening block 68 processing masked image 122 and gray level closing block 70 processing masked image 118. Gray level opening and gray level closing is analogous to binary opening and binary closing (the later of which was described with respect to binary closing block 56), but operate on a gray level rather than binary data set. A gray level opening operation 68 first performs a gray level erosion then a gray level dilation whereas the gray level closing block 70 first performs a gray level dilation then a gray level erosion.

In FIG. 10, images 122 and 118 are represented by a three-dimensional surface having spatial components x and y and brightness component B. Gray level dilation moves a three dimensional structuring element 126, analogous to the structuring element 96, and having substantially constant spherical periphery 128 about a center point 130. The center point 130 travels over each point on and under the three dimensional surface. For dilation, if the center point 130 is coincident with a point on or under the three-dimensional surface, all the points within periphery 128 are filled in. Similarly, for erosion if and only if all the points within periphery 128 are coincident with points on or under the surface, then the center point 130 is filled in. Otherwise it is cleared.

Referring to FIG. 11, the effect of the gray level opening 68 is to smooth the ringing of curve 132 being a line image through image 24 near edge 16 (similar to that shown in FIG. 1) to approximate dotted line 136 whereas the effect of the gray level closing block 70 is to cause curve 132 to approach dotted line 134. Lines 134 and 136, forming an envelope about the ringing artifacts 28, when combined by summing and averaging junction 138, produce a filtered region 140 equivalently along the dotted line 135 in FIG. 11, having substantially reduced ringing as shown by image 142. This region 140 is first masked by image 108 and then spliced into a second image 144 which includes all portions of the original image 24 corresponding to the black regions of image 108, the latter which is produced by taking an inversion of the mask of image 108 shown in FIG. 8 and applying it to the original image 24 shown in FIG. 2 by multiplier 149. The inversion is accomplished by process block 72. Image 144 and masked image 140 are then summed to produce reduced artifact image 50 as has been described above. The summing is performed by summing block 148.

The above description has been that of a preferred embodiment of the present invention. It will occur to those that practice the art that many modifications may be made without departing from the spirit and scope of the invention. For example, the technique can be applied to signals other than image signals including audio signals or multi-dimensional signals such as video where analogous artifacts to the ringing described may occur. In order to apprise the public of the various embodiments that may fall within the scope of the invention, the following claims are made.

We claim:

1. An image processing system suitable for reducing ringing artifacts in decompressed images, the images having pixels with brightness values, the image processing system comprising:

an edge detector identifying edges in the decompressed image between contrasting regions of pixels;

a mask generator receiving identified edges from the edge detector to define regions in the image adjacent to and conforming to the identified edges; and a low-pass spatial filter operating only within the defined regions to filter the decompressed image in the defined regions;

whereby ringing artifacts near image edges may be selectively reduced in the decompressed image.

2. The image processing system of claim 1 further including a human visual system model, modifying application of the low-pass filter according to a perceptual model of the sensitivity of standard human vision;

whereby filtering is reduced in regions of the image where ringing artifacts would be less perceptible.

3. The image processing system of claim 2 wherein the human visual system model reduces the low pass filtering for regions satisfying rules selected from the group consisting of: regions with low brightness values and regions with high variance in brightness values.

4. The image processing system of claim 2 wherein the human visual system model adjust the size of the regions according to a perceptual model of the sensitivity of standard human vision.

5. The image processing system of claim 2 wherein the human visual system model adjusts the low pass filter characteristics according to a perceptual model of the sensitivity of standard human vision.

6. The image processing system of claim 2 wherein the edge detector includes a differentiator differentiating the decompressed image with respect to position on the image and a threshold comparator identifying points to form the edges at locations on the image where the threshold is exceeded.

7. The image processing system of claim 6 wherein the edge detector applies a Sobel operator to the decompressed spatial image;

whereby edge detection can be performed using only integer arithmetic.

8. The image processing system of claim 6 wherein the edge detector further includes a line and curve linker connecting disjoint points identified by the threshold comparator into connected lines and curves to form the edges.

9. The image processing system of claim 1 wherein the mask generator defines the regions in the image to extend a predetermined distance away from the identified edges starting at the identified edges but not including the identified edges.

10. The image processing system of claim 1 wherein the mask generator employs successive morphologic closing and dilation operations and logical exclusive or operations;

whereby mask generation can be performed using only integer arithmetic.

11. The image processing system of claim 1 wherein the low pass spatial filter employs morphological gray level opening and closing;

whereby filtering may be performed using only integer arithmetic.

12. The image processing system of claim 1 wherein the low-pass spatial filter includes a masked area extractor, extracting only portions of the decompressed image within exposed regions of the mask to create a masked image which is filtered and wherein the system further includes an inverted mask extractor extracting only portions of the decompressed image outside the exposed regions of the mask to create an inverted mask image, and wherein the system further includes an image summer combining the filtered mask image and inverted mask image to produce a filtered decompressed image;

whereby the low-pass filter may be applied to an entire image area of the masked image without regard to the regions.

13. The image processing system of claim 12 wherein the low-pass spatial filter further includes a processing path generating two versions of the mask image, a first version in which the region outside the mask image is set to a first value and a second version in which the region outside the mask image is set to a second value different than the first value and wherein both the first and the second versions provide data in their unmasked regions from the decompressed image and wherein both the first and second versions are filtered and combined;

whereby an artifact that may be caused by the filter operating on the second version of the mask image is avoided.

14. The image processing system of claim 13 wherein the first value is zero and the second value is a value providing the greatest possible pixel brightness.

15. The image processing system of claim 13 wherein the combination is performed by an integer adder and a single bit right-shifter;

whereby the combination may be performed using integer arithmetic.

16. The image processing system of claim 1 wherein the mask generator defines regions in the image on two sides of the identified edges, but not including the identified edges.

* * * * *

UNITED STATES PATENT AND TRADEMARK OFFICE
CERTIFICATE OF CORRECTION

PATENT NO. : 6,668,097 B1
DATED : December 23, 2003
INVENTOR(S) : Yu Hen Hu et al.

It is certified that error appears in the above-identified patent and that said Letters Patent is hereby corrected as shown below:

Title page,
Item "[22] PCT Filed: August 9, 1999" should be
-- [22] PCT Filed: September 8, 1999 --.

Signed and Sealed this

Eighteenth Day of May, 2004

JON W. DUDAS
*Acting Director of the United States Patent and Trademark Office*